US006539426B1

(12) United States Patent
Meek et al.

(10) Patent No.: US 6,539,426 B1
(45) Date of Patent: Mar. 25, 2003

(54) MANAGING OPERATION OF SERVERS IN A DISTRIBUTED COMPUTING ENVIRONMENT

(75) Inventors: Stephen Meek, Ipswich (GB); Neil D Winton, Felixstowe (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,957

(22) PCT Filed: Jan. 27, 1998

(86) PCT No.: PCT/GB98/00235

§ 371 (c)(1),
(2), (4) Date: Jul. 21, 1998

(87) PCT Pub. No.: WO98/33307

PCT Pub. Date: Jul. 30, 1998

(30) Foreign Application Priority Data

Jan. 28, 1997 (EP) .............................................. 97300523

(51) Int. Cl.$^7$ ................................................ G06F 13/00
(52) U.S. Cl. ........................ 709/223; 709/217; 709/218; 709/328
(58) Field of Search ................................ 709/203, 224, 709/205, 204, 217, 227, 232, 218, 206, 223, 328; 707/10

(56) References Cited

U.S. PATENT DOCUMENTS

| 5,680,615 A | * | 10/1997 | Marlin | 709/203 |
| 5,758,083 A | * | 5/1998 | Singh et al. | 709/223 |
| 5,774,668 A | * | 6/1998 | Choquier | 709/203 |
| 5,918,013 A | * | 6/1999 | Mighdoll et al. | 709/217 |
| 5,918,228 A | * | 6/1999 | Rich et al. | 707/10 |

* cited by examiner

*Primary Examiner*—Ayaz Sheikh
*Assistant Examiner*—Khanh Quang Dinh
(74) *Attorney, Agent, or Firm*—Nixon & Vanderhye P.C.

(57) ABSTRACT

A distributed processing system comprises hardware, e.g. computers (1,2,3,6,7, 9) and networks (8,10), supporting a user client applications, server applications capable of exposing user application interfaces to the user client application, and a management client application. The server applications are capable of exposing a common management interface to the management client application. Thus, the system can be managed at a lower level than is possible with prior art approaches.

28 Claims, 2 Drawing Sheets

MANAGING OPERATION OF SERVERS IN A DISTRIBUTED COMPUTING ENVIRONMENT

BACKGROUND OF THE INVENTION

1. Field of the Invention

This invention relates to managing operation of processes constructed from software components and running on servers in a distributed computing environment, for which management of the service is carried out from a management location that is in communication with the servers.

2. Related Art

In a corporate environment, computer systems at remote locations are often connected in a network. The computers may be located at widely spaced locations for example, in different countries and are connected through a wide area network (WAN) through conventional telecommunications systems or ISDN links. It is uneconomic to have local operation and management of each computer system in each location and hence, hitherto, facilities have been provided to allow remote operation and management of the individual computer systems from a management location, remote from the individual computer systems. Personnel at the management location thus do not have physical access to the individual computers. Hardware and software vendors commonly provide facilities to manage systems from a management location at the level of the computer operating system but do not provide standard functions which can be applied at an application program level e.g. at a business application level. For example, in the case of UNIX system it is known to use the "Net View 6000" network monitor tool from IBM which allows the individual computers, referred to herein as servers, in the network to be monitored. However, only limited control is possible. The network tool allows the individual servers to be switched off by means of a "stop listening" command sent to the server and also to interrogate the state of the server by means of an "are you listening?" command which provides information to the management location concerning the operational status of the server.

Recent developments in the field of software engineering include the use of resuable components to constuct applications. It is desirable that these components be manageable at run-time. However, they are invisible to presently available management tools which cannot see past the process level. Thus, conventional software for a distributed processing environment (DPE) does not permit satisfactory control at the component level of individual business applications programs that are distributed amongst the servers in the network.

The present invention seeks to overcome this problem.

The following terminology is used herein:

GLOSSARY

"server machine" means a computer connected to a network running processes on behalf of other machines.

"client machine" means a computer connected to a network running processes which request processing by a server machine.

"server application" means an application program or library that exposes an interface for control and input and output of data.

"client application" means an application program configured to interact with a server application via its interface.

"process" means an instance of a server application running on a server machine.

"component" means a software structure having its own interface for exposing functions, procedures, methods, or properties to other software structures by means of late binding.

Recent developments in software engineering have led to the ability of one program, "the client", to delegate processing to another program, "the server". Examples of this are OLE2 supported in the Microsoft (RTM) Windows environment and the RPC (Remote Procedure Call) capability of DCE (Distributed Computing Environment) in UNIX systems.

In DCE, when a client application needs the services of a remote server application, i.e. one which is accessible throughout a network, it first authenticates itself with the DCE security service. The CDS (Cell Directory Service) is then accessed to retrieve a binding which is used by DCE to control communication between the client application and an interface of server application. It will be appreciated that one application may expose more than one interface.

Considering the case of a client-server customer data access system, a client application provides a user interface and a server application searches a database. If an end user wishes to retrieve information about a customer, the end user will enter, for example, the customer's reference. If a binding to the server application has not already been obtained, this will be obtained from the CDS. Once the binding has been obtained, the server application's interface will be exposed to the client application. The client application can then call the server application's "FIND_CUSTOMER_DATA_FROM_REF" function, sending the input reference as a parameter. An instance of the server application is then run to retrive the customer data from a database. The retrieved data is then sent to the client application as the result of the called function, as if the function were part of the client application, and displayed to the user.

SUMMARY OF THE INVENTION

The present invention makes use of the ability of server applications to expose interfaces in this way to expand the management capabilities of distributed processing environments.

According to the present invention, there is provided a distributed processing system comprising hardware supporting at least one user client application, a plurality of server applications capable of exposing user application interfaces to a user client application, and a management client application, wherein the server applications are capable of exposing a common management interface to the management client application. Thus, each server application has two faces. One face is shown to an end-user client application on a client machine and the other is shown to a management client application on a management client machine.

Preferably, a system according to the present invention comprises a user client computer running the user client application, an application server computer running said plurality of server applications and a management client computer running the management client application. More preferably, a further application server computer running at least one server application is provided.

Prefererably, a system according to the present invention includes a database server configured to process data at the request of a server application.

Preferably, a network provides communication between the client applications and the server applications. The management client may communicate with the server applications via a further network and a gateway server.

According to the present invention, there is also provided a method of managing operation of server-applications in a distributed computing environment in which the server applications comprise individual components exposing respective interfaces, and management of the server applications is carried out from a management location that is in communication with the server applications, the method comprising-transmitting from the management location to the individual server applications, management commands to control or retrive information on individual server applications and individual server application components whereby to manage the computing processes from the management location.

Preferably, the method includes reporting from the individual server applications to the management location the status of said components.

Preferably, the method includes carrying out the reporting to the mangement location in reponse to the commands.

Preferably, the method includes displaying the status of the individual application servers and components on a common display at the managemment location.

Preferably, the management commands perform one or more of the following functions: disable, enable, save data from, load data into, get a particular attribute of, set a particular attribute of, or list attributes of a particular server application or component.

Preferably, the servers are coupled to the management location through a network, and including transmitting the management commands in a predetermined standard, and converting the commands received through the network at indivdual ones of the servers from the standard, into a protocol suitable for use by the individual server.

According to the present invention, there is further provided a distributed computing environment comprising a plurality of servers which process individual components of computing processes distributed amongst the servers, a management controller that communicates with the servers, and means for transmitting from the management controller to the individual servers, management commands that control the individual components of the processes run by the servers, whereby to manage the computing processes from the management controller.

According to the present invention, there is still further provided a management controller for use in a distributed computing environment in which a plurality of server machines perform a plurality of computer processes, distributed amongst the servers, made up of individual components, the management controller including means for transmitting to the individual servers management commands that control the individual components of the processes run by the servers, whereby to manage the computing processes from the management controller.

According to the present invention, there is yet further provided a server for use in a distributed computing environment for processing individual components of computing processes distributed amongst a plurality of such servers under the control of a management controller comprising means for receiving from the management controller, management commands that control the individual components of the process or processes run by the server whereby to permit management of the computing process or processes from the management controller.

BRIEF DESCRIPTION OF THE DRAWINGS

In order that the invention may be more fully understood embodiments thereof will now be described by way of example with reference to the accompanying drawings in which.

DETAILED DESCRIPTION OF EXEMPLARY EMBODIMENTS

Figure 1:
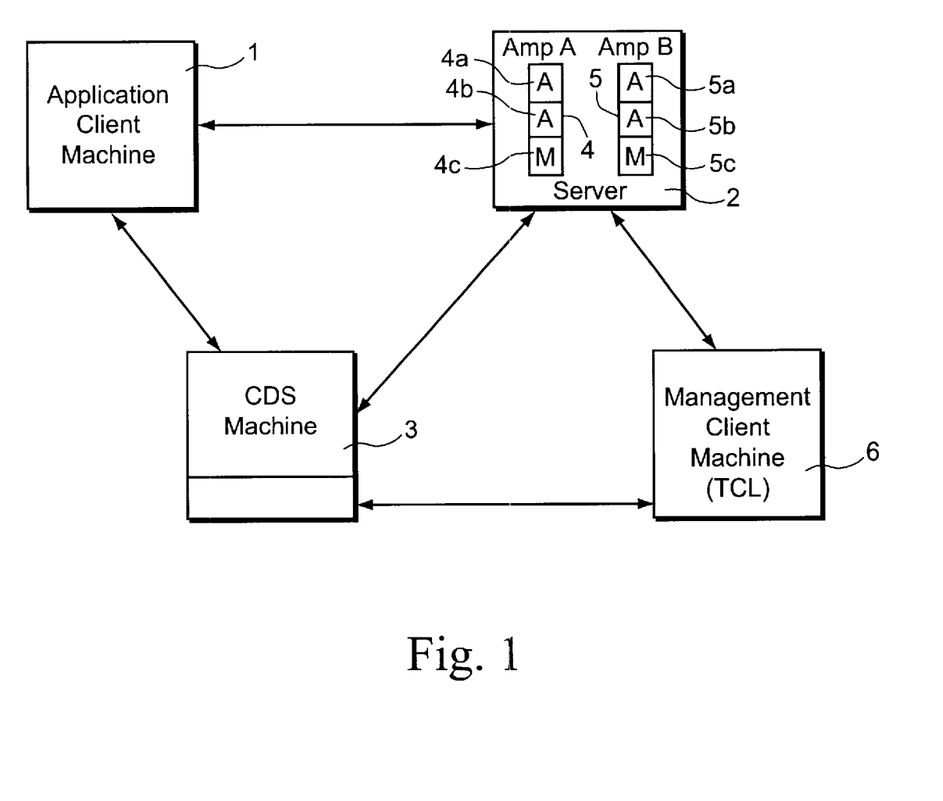
FIG. 1 is a schematic diagram illustrating an embodiment of the present invention.

Referring to FIG. 1, a client machine 1 is able to communicate with a server machine 2 and a machine 3 implementing a CDS. The server machine 2 is loaded with instances of two server applications 4, 5. A management client machine 6 is also able to communicate with the server machine 2 and the CDS machine 3. The management client application comprises a Tcl (Tool Command Language) script.

The server applications 4, 5 comprise, in these examples, two application components 4a, 4b, 5a, 5b, a management component 4c, 5c and infrastructure code. The application components 4a, 4b, 5a, 5b provide groups of functions useful for achieving the aims of an end user, for example data access or quote calculations. These functions are exposed via DCE RPC interfaces of the respective components. The management components 4c, 5c provide functions useful to a system adminstrator and are also exposed via respective DCE RPC interfaces.

When an instance of a server application 4, 5 is created in the server machine 2, its DCE RPC interfaces are registered with the CDS. The application component interfaces are collected into a group in the CDS which is visible to client applications running on the client machine 1. The management component interfaces are collected into another group in the CDS which is visible to a management application running on the application client machine 1.

A key feature is that each of the management components 4c, 5c presents that same interface to the management client application. Thus, the same calls can be made to the management components of each server application even though the server applications may perform very different tasks or have been written by different software developers. This uniformity can be ensured by supplying a library of C++ foundation classes to developers. These classes may be used as supplied or decendant classes, inheriting the core functionality of the foundation classes, may be derived. It will be seen from the following that the developers must ensure that certain methods are available in the application components in order for the management component to report application component status information.

The following is a specification for the common management interface, setting out the minimum functionality required and possible enhancements.

1. sm_svr_stop

The sm_svr_stop management function will stop the server application listening for incoming requests and cause the server application process to exit.

There are three modes of operation supported by this function. These are as follows:

Normal

Forced (with grace period)

Abort

A "normal" stop causes all the application interfaces endpoints to be removed from the local endpoint map and the interfaces to be unregistered from the RPC runtime. The associated CDS entries are also unexported, if they have previously been exported by the server application. The server process is then terminated in a clean and controlled manner.

Both the "forced" and "abort" operations may leave the server machine in an unclean state which will require some housekeeping to be subsequently carried out. It is the responsibility of the application developer to ensure that the appropriate routines are available to effect a clean-up operation.

Minimum Behaviour

For a "normal" stop request the server application should examine the operational state of all its exporting interfaces to determine their current operational state. If all of the exporting interfaces are in the SM_OPSTATE_DISABLED or SM_OPSTATE_WITHDRAWN operational state then the operation should stop the server application listening by issuing rpc_mgmt_stop_server_listening and return SM_S_OK. If the exporting interfaces are not in the SM_OPSTATE_DISABLED or SM_OPSTATE_WITHDRAWN operational state, the application server should take no further action and return SM_S_INTERFACE_STATE_FORBIDS.

For a "forced" stop request, the server application should immediately be prevented from accepting any further requests for service. This will require the RPC management operation rpc_mgmt_stop_server_listening( ) to be issued to the server application. Once this request has been processed, the application server should return SM_S_OK.

An "abort" stop request should result in an immediate process exit.

NOTE: For an "abort" stop request, there will be no return code received to indicate successful or unsuccessful completion of the operation.

Recommended Behaviour

There is no additional recommended behaviour for a "normal" stop request. For a "forced" stop request, if all the exporting interfaces of the server application are in the SM_OPSTATE_DISABLED or SM_OPSTATE_WITHDRAWN operational state or the grace period is zero then the routine should stop the server application listening by issuing the rpc_mgmt_stop_server_listening request and return SM_S_OK.

If any of the exporting interfaces of the server application are either in the SM_OPSTATE_ENABLED or SM_OPSTATE_DISABLING operational state, the behaviour depends on the value of the grace parameter. The grace parameter specifies a time period in which the server application can complete its current processing. When this time period has been exceeded, the rpc_mgmt_stop_server_listening( ) routine should be issued and SM_S_OK returned.

The purpose of the grace period is to allow the exporting interfaces which are not currently in the SM_OPSTATE_DISABLED or SM_OPSTATE_WITHDRAWN operational state to complete their current processing in a controlled manner before the server application is stopped.

2. sm_svr_test

The sm_svr_test management function will provide the facility for an management client to perform a variety of tests on a server application. This is includes the following:

"PING"

The standard "PING" test will enable a management client to determine whether or not a server application is currently listening for requests. The test is analogous to the UNIX PING command.

Additional standard tests may be defined and supported through the sm_svr$_{13}$ test function. It is also recommended that application specific tests may be defined which facilitate the testing of application specific components and operations.

Minimum Behaviour

Server applications support the "PING" test function. This will enable the management client to determine whether the specified server application is listening for requests. A successful "PING" test will result in SM_S_OK being returned to the management client.

Recommended Behaviour

Application specific tests may be defined where appropriate to enable an management client to test the various functions and operations of the server application. Application specific tests may support additional parameters through the SM_AttrVal_t structure.

3. sm_svr_backup

The sm_svr_backup management function will save to persistent storage e.g. hard disc, all the information relevant to the operation of the specified server application. The backup information must include all the information necessary to ensure that the server application can (if necessary) be returned to a previously known state and configuration.

A "DEFAULT" operation may perform a complete backup of the server application including both management and application specific information.

A "MIB" operation may be provided to perform the same function as the "DEFAULT" backup operation, although it will only be the MIB attributes that are explicitly saved to persistent storage.

The sm_svr_backup function will return a unique name by which the saved information can be referenced.

Minimum Behaviour

The "DEFAULT" backup operation is to perform a full server application backup of information and save the information to persistent storage. The sm_svr_backup operation should return a unique value by which this backup operation and information may be referenced.

To ensure a consistent backup operation is performed, each exporting interface of the server application should be in a SM_OPSTATE_DISABLED or SM_OPSTATE_WITHDRAWN operational state. This will ensure that no processing is continuing while the backup routine is in operation.

The "MIB" backup operation will perform a backup of only the MIB attributes for the specified server application. This is to force the MIB attribute information to be saved to persistent storage. As with the "DEFAULT" backup operation, the sm_svr_backup operation will return a unique value by which this backup operation and information may be referenced.

It is also the responsibility of the application developer to ensure that the identity and location of the backup information is unique.

Upon the completion of a successful backup operation, the status code of SM_S_OK is returned to the management workstation.

Recommended Behaviour

There is not additional recommended behaviour for this operation.

4. sm_svr_restore

The sm_svr_restore management function will restore the specified server application to a known state and configuration. The known state and configuration information may be sourced from either previously backed up information or from a default set of state and configuration values.

Minimum Behaviour

The "DEFAULT" restore operation will restore to the server application the default state and configuration information held in the file specified by the tag parameter. If a tag parameter is set to NULL, then the information to be restored will be retrieved from a pre-defined default file location.

To ensure a consistent restore operation is performed, each exporting interface of the server application should be in the SM_OPSTATE_DISABLED or SM_OPSTATE_WITHDRAWN operational state. This will ensure that no processing is continuing while the restore routine is in operation.

The "MIB" restore operation will restore to the server application the MIB information held in the file specified by the tag parameter. If the tag parameter is NULL then the information to be restored will be retrieved from a pre-defined default file location.

Upon the completion of a successful restore operation, the status code of SM_S_OK should be returned.

5. sm_svr_list_ifs

The sm_svr_list_ifs management function returns a list of all the exporting interfaces of the application components of a server application. The list will include, for each exporting interface, a character string description of the interface and the interface UUID.

Minimum Behaviour

Each server application must be capable of supporting the sm_svr_list_ifs operation. The operation will be required to query the specified application server and return the description and UUID of all the exporting interfaces.

If the returned array of interfaces is full then there is the possibility that additional information could not fit into the specified array size. In such cases, a secondary call the sm_svr_list_ifs should be made in order to return the remaining information.

6. sm_if_disable

The sm_if_disable management function disables a specified application interface to prevent it from accepting any further incoming requests. Application interfaces support four valid operational states, SM_OPSTATE_ENABLED, SM_OPSTATE_DISABLED, SM_OPSTATE_DISABLING and SM_OPSTATE_WITHDRAWN. When the wait parameter is set to a TRUE value, the sm_if_disable operation will not return until the application interface has completed its current processing and its operational state has been changed to SM_OPSTATE_DISABLED or SM_OPSTATE_WITHDRAWN.

When the withdraw parameter is set to a TRUE value, the exporting application interface information will be removed from the local endpoint map and unregistered from the RPC runtime. Any application information that is exported to the CDS should remain untouched.

When the withdraw parameter is set to a FALSE value, no operations are performed on the local endpoint map or RPC runtime. Any application information that is exported to the CDS should also remain untouched. The following table outlines the behaviour of the application interface when in the associated operational state.

| Operational State | Behaviour |
| --- | --- |
| SM_OPSTATE_ENABLED | All requests to the application interface are accepted and processed as normal. |
| SM_OPSTATE_DISABLING | New requests to the application interface are rejected, unless the request forms part of a sequence of other requests. This is particularly important when using context handles to maintain contextual information across sequences of RPC operations. Existing requests are allowed to complete before the interface is changed to one of the following operational states, depending upon the value of the withdraw parameter. |
| SM_OPSTATE_DISABLED | New requests to the interface are rejected. If it is an exporting interface, then the interface information will still exist within the local endpoint map, RPC runtime and CDS. Once an application interface is in this operational state then it will not be performing any new or current work. |
| SM_OPSTATE_WITHDRAWN | New requests to the interface are rejected. If it is an exporting interface, then the interface information no longer exists within the local endpoint map and RPC runtime. The exporting application interface entry still however remains in the CDS. |

The following diagram demonstrates the sequence of operational states given an sm_if_disable operation.

Figure -1: Sequence of operational states on sm_if_disable withdraw = FALSE withdraw = TRUE The state table below indicates the valid and invalid transitions from one operational state to another (this include the operations of both sm_if_enable and sm_if_disable).

|  | Management Operation | | |
| --- | --- | --- | --- |
| Current operational state | sm_if_enable | sm_if_disable (withdraw = 0) | sm_if_disable (withdraw = 1) |
| ENABLED | ✓ | ✓ | ✓ |
| DISABLING | ✓ | X | X |
| DISABLED | ✓ | ✓ | ✓ |
| WITHDRAWN | ✓ | X | ✓ |

✓-Indicates that the operation is allowed
X-Indicates that the operation is not allowed Where the operation is not allowed, an error code of SM_S_INTERFACE_STATE_FORBIDS should be returned.

Minimum Behaviour

If an sm_if_disable function is performed on a non-exporting interface then the minimum behaviour is to return a status code of SM_S_NOT_POSSIBLE and to take no further action.

For an exporting interface, a wait no withdraw operation should be performed as the default. This will disable the specified exporting interface preventing any further access but allowing any existing processing to complete before being placed into an SM_OPSTATE_DISABLED operational state.

Recommended Behaviour

When the withdraw parameter is FALSE then no operations are performed on the endpoint map or RPC runtime. However when the withdraw parameter is TRUE then the following operations should be performed:

The exporting application interfaces endpoints should be removed from the local endpoint map. This will prevent any new requests from locating the application interface.

Additionally, the application interface should be unregistered from the RPC runtime. This will prevent any further operations to the application interface. Once completed, the operational state should be changed to SM_OPSTATE_WITHDRAWN and SM_S_OK returned.

7. sm_if_enable

The sm_if_enable management function will enable the specified application interface to allow it to accept incoming requests.

Minimum Behaviour

If an sm_if_enable function is performed on a non-exporting interface then the minimum behaviour is to return a status code of SM_S_NOT_POSSIBLE and to take no further action.

For an exporting interface the behaviour depends upon the operation performed by any previous sm_if_disable operation.

If no operations were performed on the RPC runtime or local endpoint map (i.e. sm_if_disable was issued with the withdraw parameter set to FALSE) then the sm_if_enable command should result in the operational state of the application interface being changed from SM_OPSTATE_DISABLED to SM_OPSTATE_ENABLED and SM_S_OK returned.

If the interface information has been removed from the RPC runtime and local endpoint map (i.e. sm_if_disable was issued with the withdraw parameter set to TRUE) then the sm_if_enable command should result in the application interface being re-registered with the RPC runtime and the endpoints being exported to the endpoint map. The operational state of the application interface should then be changed from WITHDRAWN to ENABLED and SM_S_OK returned.

8. sm_if_test

The sm_if_test management function will provide the facility for a management client to perform a variety of tests on the specified application interface, for example, the following

"PING"

This standard "PING" test will enable a management client to determine whether or not an application interface is currently capable of servicing requests. The test is analogous to the UNIX PING command.

It is expected that additional standard tests will be defined and supported through the sm_if_test function. It is also recommended that application interface specific tests will be defined which will facilitate the testing of application interface specific components and operations.

Minimum Behaviour

Application interfaces must support the "PING" test function. This will enable the management client to determine whether the specified application interface is currently capable of processing requests. A successful "PING" test will result in SM_S_OK being returned.

Recommended Behaviour

Application interface specific tests should be defined where appropriate to enable a management client to test the various functions and operations of the application interface. Application interface specific tests may support additional parameters through the SM_AttrVal_t structure.

9. sm_if_save

The sm_if_save management function will save to persistent storage all the information relevant to the operation of the specified application interface. The save operation includes all the information necessary to ensure that the application interface a can (if necessary) be returned to a previously known state and configuration.

The "DEFAULT" operation performs a complete save of the application interface including both management and application interface specific information.

The "MIB" operation will perform the same function as the "DEFAULT" save operation, although it will only be the MIB attributes that are explicitly saved to persistent storage.

The sm_if_save function will return a unique name by which the saved information should be referenced.

Minimum Behaviour

The "DEFAULT" save operation is to perform a full application interface save of information to persistent storage. The sm_if_save operation should return a unique value by which this save operation and information can be referenced.

To ensure a consistent save operation is performed, the application interface should be in the SM_OPSTATE_DISABLED or SM_OPSTATE_WITHDRAWN operational state. This will ensure that no processing is continuing while the save routine is in operation.

NOTE: Implementations of the sm_if_save operation may provide a better guarantee of consistency. The influential factor is essentially the type of interface (exporting or non-exporting) and the style of operation.

The "MIB" save operation will perform a save of only the MIB attributes for the specified application interface. This will force the MIB attribute information to be saved to persistent storage. As with the "DEFAULT" save operation, the sm_if_save operation will return a unique value by which this saved information may be referenced.

It is also the responsibility of the application developer to ensure that the location of the saved information is unique.

Upon the completion of a successful save operation, the status code of SM_S_OK should be returned.

Recommended Behaviour

The "ACL" operation should result in the access control information of the application interface being saved to persistent storage in a uniquely identified file.

10. sm_if_load

The sm_if_load management function will reset the specified application interface to a previously known state and configuration. The information may be loaded from either a previously saved information or from a default configuration file.

The sm_if_save operation should not over write existing transient MIB information such as statistical counters etc. Otherwise it may be possible for a restore operation (for example) to reset the ifInRequests attribute back to zero or some previous number.

Minimum Behaviour

The "DEFAULT" load operation will load to the application interface the default state and configuration information held in the file specified by the tag parameter. If the tag parameter is NULL then the information to be restored will be retrieved from a pre-defined default file location.

To ensure a consistent restore operation is performed, the exporting application interface should be in the SM_OPSTATE_DISABLED or SM_OPSTATE_WITHDRAWN operational state. This will ensure that no processing is continuing while the load routine is in operation.

The "MIB" load operation will load to the application interface the MIB information held in the file specified by the tag parameter. If the tag parameter is NULL then the information to be restored will be retrieved from a pre-defined default file location.

Upon the completion of a successful restore operation, the status code of SM_S_OK should be returned.

Recommended Behaviour

The "ACL" operation should result in the access control information of the application interface being reset to a pre-defined set of values.

Upon the successful completion of the sm_if_load operation, the status code of SM_S_OK should be returned.

11. sm_if_list_attrs

The sm_if_list_attrs management function provides a list of all the supported attributes of the specified application interface. The list will include a character string description of the attributes that are supported by the application interface. This management function will not return the attribute values.

Minimum Behaviour

Each application interface should support the ability to return a list of supported attributes. The values of the attributes are not required to be returned as a result of a sm_if_list_attrs operation.

If the returned array of attributes is full then there is the possibility that additional information could not fit into the specified array size. In such cases a secondary call the sm_if_list_attrs should be made in order to return the remaining information.

12. sm_if_get_attr

The sm_if_get_attr management function will return the value of the specified attribute of the specified application interface.

Minimum Behaviour

Each application interface should return the value of the specified attribute.

Recommended Behaviour

Further application interface specific attributes should be defined to enable a more comprehensive set of management information to be retrieved.

13. sm_if_set_attr

The sm_if_set_attr management function changes the value of the specified attribute of the application interface to the new value specified.

It should be noted that setting an attribute to a new value will potentially affect the behaviour of the application interface.

Minimum Behaviour

Each application interface should change the value of the specified attribute to the new value specified in the sm_if_set_attr operation. A successful change should result in SM_S_OK being returned.

A large scale system embodying the present invention will now be described.

Figure 2:
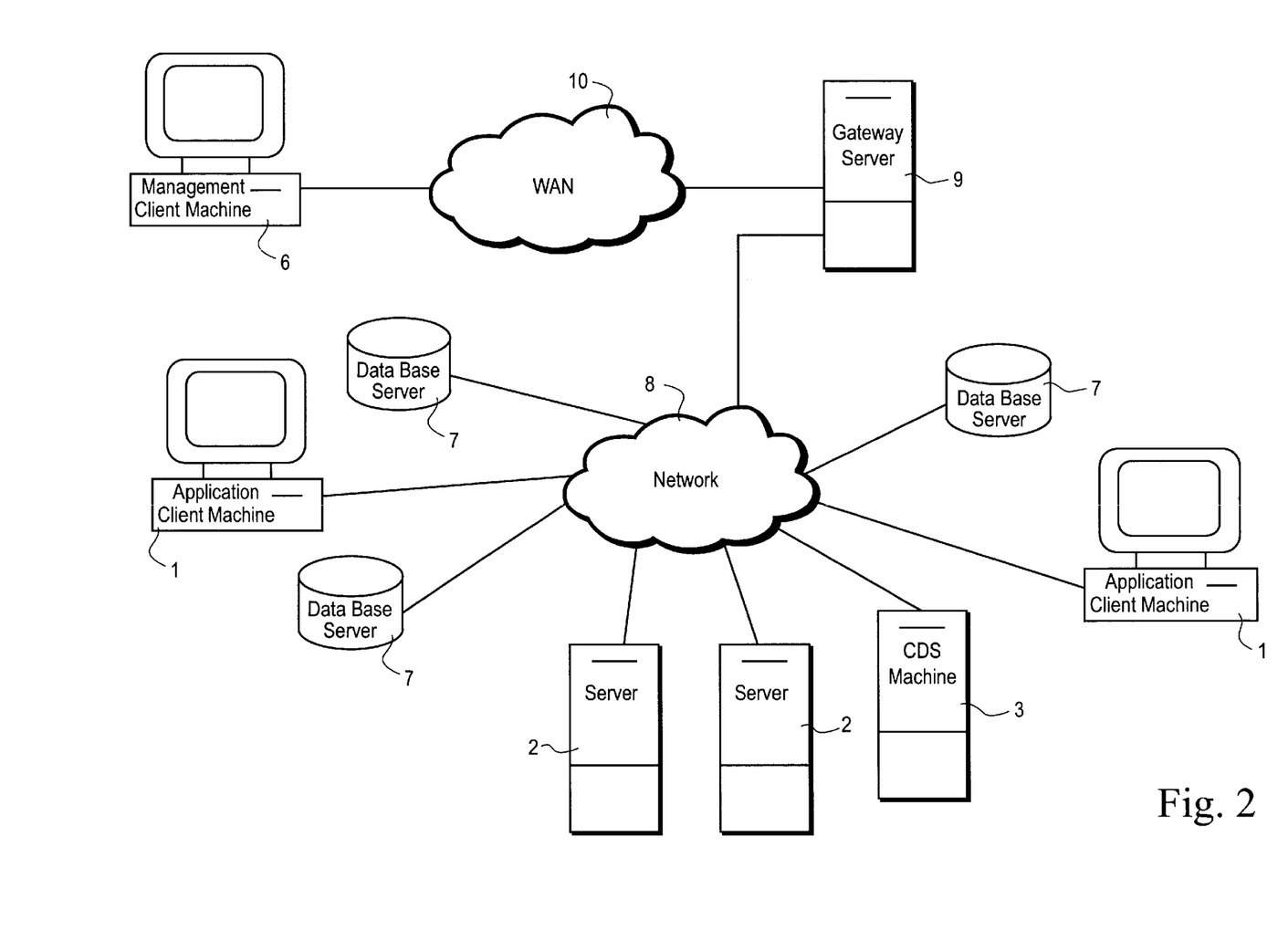
FIG. 2 is a schematic diagram illustating a large scale system embodying the present invention.

Referring to FIG. 2, a plurality of client machines 1, a plurality of server machines 2, a plurality of database servers 7 and a server 3 implementing the CDS are connected to each other by a UNIX-based network 8. A management client machine 6 is not connected directly to the network 8 but is connected to a management gateway server 9 via a wide area network 10.

The wide area network 10 uses different protocols to the network 8 and the management gateway server 9 is therefore required to perform protocol conversion.

An example of the operation of the system shown in FIG. 2 will now be described.

When a user at a client machine 1 wishes to perform a data access function, the client application running on the client machine 1 first obtains a binding for the interface of an instance of the appropriate application component interface. Multiple instances of server applications may exist on one or more of the server machines 2. It may be that no instances of the necessary server application are available, in which case a further instance may be created on one of the server machines.

Once the binding has been obtained, the client application calls the function via the interface identified by the binding. The server machine running the server application providing the identified interface then performs the called function and accesses data on one or more of the database servers 7. The resultant data is then made available to the calling client application.

If a system administrator wishes to determine which application components are present, the administrator uses the management client, running on the management client machine. The management client calls the sm_svr_list_ifs function of the management components of each server application. The management client obtains a binding for each of the management component interfaces. This cannot be done directly however. The management client sents the request for a binding to the management gateway server 9 which then interrogates the CDS on behalf of the management client and then passes back the binding converted according to the protocol of the wide area network.

Having obtained the necessary binding, the management client issues a sm_svr_list_ifs to the management gateway server 9 which then calls the sm_svr_list_ifs function of the first management component on one of the applications server machines 2. The result of the function is then passed on to the management client which displays the information to the system administrator. This procedure is repeated for each server application. However, it will be appreciated that all of the bindings could be obtained before the first function call is made. Furthermore, the management gateway server 9 may be used to cache binding requests and function calls from the management client machine 6.

Although the management gateway server is shown on a dedicated machine, it could be implemented on any one of the servers 2, 3 in FIG. 2.

What is claimed is:

1. A distributed processing system comprising:
   at least two different client applications, a first of which comprises a user client application and a second of which comprises a management client application, and
   at least two different server applications capable of exposing application interfaces to the client applications,
   wherein the at least two different server applications are capable of exposing different respective user application interfaces to at least one user client application,
   the at least two different server applications are capable of exposing a common management interface, for control and input and output of data, to the management client application, and
   the at least one user client application can each be used by a user to interact with at least one of said at least two different server applications via a user application interface and the management client application can be used by a user to interact with any one of said at least two different server applications via the common management interface.

2. A system as in claim 1, further comprising:
   a user client computer running the user client applications,
   an application server computer running said server applications, and
   a management client computer running the management client application.

3. A system as in claim 2, including a further application server computer running at least one of said server applications.

4. A system as in claim 1 including a database server configured to process data at the request of at least one of said server applications.

5. A system as in claim 1 including a network providing communication between the client applications and the server applications.

6. A system as in claim 5, wherein the management client application communicates with the server applications via a further network and a gateway server.

7. A distributed processing system as in claim 1 wherein a machine supporting the management client application communicates with at least one server supporting the server applications through a management gateway server, the management gateway server being arranged between the machine supporting the management client application and the at least one server supporting the server applications.

8. A method of managing operation of at least two different server applications in a distributed computing environment, wherein:
   the at least two different server applications are capable of exposing different respective user application interfaces to at least one user client application,
   the at least two different server applications are capable of exposing a common management interface, for control and input and output of data, to a management client application, and
   management of the server applications is performed from a management location that is in communication with the server applications,
   the method comprising:
   receiving user inputs, and
   responding to said user inputs by transmitting from the management location to the at least two different server applications management commands to control, or input or output data, via the common management interface, to manage the at least two different server applications from the management location.

9. A method as in claim 8, including reporting from the individual server applications to the management location of individual server application components.

10. A method as in claim 9, including carrying out the reporting to the management location in response to the commands.

11. A method as in claim 8, including displaying the status of the individual application servers and individual server application components on a common display at the management location.

12. A method as in claim 8 wherein the management commands perform one or more of the following functions:
   disable, enable, save data from, load data into, get a particular attribute of, set a particular attribute of, or list attributes of a particular server application or individual server application component.

13. A method as in claim 8 wherein the servers are coupled to the management location through a network, and including:
   transmitting the management commands in a predetermined standard, and
   converting the commands received through the network at individual ones of the servers from the standard, into a protocol suitable for use by the individual server.

14. A method as in claim 8 further comprising:
   supporting the management client application in a management client machine;
   supporting the at least two different server applications in at least one server; and
   arranging a management gateway server between the management client machine and the at least one server supporting the server applications.

15. A management controller for use in controlling at least two different server applications in a distributed computing environment, the management controller comprising:
   a management client application for use by a user in controlling any one of said at least two different server applications,
   a user input to the management client application, and
   an output for management commands from the management client application to control any one of the at least two different server applications,
   wherein said at least two different server applications are each capable of exposing a common management interface, for control and input and output of data, to the management client application, and the management client application is adapted to control any one of said at least two different server applications via the common management interface.

16. Server apparatus for use in a distributed computing environment, the apparatus comprising one or more servers supporting at least two different server applications under the control of a management controller according to claim 15, said server apparatus comprising a receiver for receiving management commands from the management controller and inputting the management commands to any one of said at least two different server applications, each of said at least two different server applications being capable of exposing a common management interface, for control and input and output of data, to the management client application comprised by the management controller.

17. A controller as in claim 15, wherein a machine supporting the management client application communicates with at least one server supporting the server applications through a management gateway server, the management gateway server being arranged between the machine supporting the management client application and the at least one server supporting the server applications.

18. A distributed processing system comprising:
   a first server application having a first application component and a first management component; and
   a second server application having a second application component and a second management component, the first and second server applications being different;
   a user client application capable of receiving input to execute at least one of the server applications;
   a management client application capable of receiving input to control at least one of the server applications;
   wherein the first and second application components respectively present interfaces to the user client application, and the first and second management components present the same interface to the management client application.

19. A distributed processing system as in claim 18 wherein a machine supporting the management client application communicates with at least one server supporting the first and second server applications through a management gateway server, the management gateway server being arranged between the machine supporting the management client application and the at least one server supporting the server applications.

20. A method of managing operation of at least two different server applications in a distributed computing environment, the method comprising:
   providing a first server application having a first application component and a first management component;
   providing a second server application having a second application component and a second management component, the first and second server applications being different;
   receiving user input into a user client application to execute at least one of the server applications;
   receiving user input into a management client application to control at least one of the server applications;
   wherein the first and second application components respectively present interfaces to the user client application and the first and second management components present the same interface to the management client application.

21. A method as in claim 20 further comprising:
   supporting the management client application in a management client machine;
   supporting the server applications in at least one server; and
   arranging a management gateway server between the management client machine and the at least one server supporting the server applications.

22. A management controller for use in controlling at least two different server applications in a distributed computing environment, the management controller comprising:
   a management client application for use by a user in controlling a first or second server application;
   a user input to the management client application; and
   an output for management commands from the management client application to control the first or second different server application;
   wherein the first server application and the second server application each has a application component and a management component, each of the management components presenting the same interface to the management client application.

23. A controller as in claim 22, wherein a machine supporting the management client application communicates with at least one server supporting the server applications through a management gateway server, the management gateway server being arranged between the machine supporting the management client application and the at least one server supporting the server applications.

24. A distributed processing system comprising:
   at least two different client applications, a first of which comprises a user client application and a second of which comprises a management client application, and
   at least two different server applications capable of exposing application interfaces to the client applications,
   wherein the at least two different server applications are capable of exposing different respective user application interfaces to at least one user client application,
   the at least two different server applications are capable of exposing a common management interface, for control and input and output of data, to the management client application,
   the at least one user client application can each be used by a user to interact with at least one of said at least two different server applications via a user application interface and the management client application can be used by a user to interact with any one of said at least two different server applications via the common management interface; and
   the management client application is capable of communicating data to the two different server applications through a first communication link and the user client application is capable of communicating data to the two different server applications through a second communication link, the first and second communication links being completely separate communication links.

25. A method of managing operation of at least two different server applications in a distributed computing environment, wherein:
   the at least two different server applications are capable of exposing different respective user application interfaces to at least one user client application,
   the at least two different server applications are capable of exposing a common management interface, for control and input and output of data, to a management client application, and
   management of the server applications is performed from a management location that is in communication with the server applications,
   the method comprising:
      receiving user inputs, and
      responding to said user inputs by transmitting from the management location to the at least two different server applications management commands to control, or input or output data, via the common management interface, to manage the at least two different server applications from the management location;
      wherein the management client application is capable of communicating data to the server applications through a first communication link and the user client application is capable of communicating data to the two different server applications through a second communication link, the first and second communication links being completely separate communication links.

26. A management controller for use in controlling at least two different server applications in a distributed computing environment, the management controller comprising:

a management client application for use by a user in controlling any one of said at least two different server applications, a user input to the management client application, and an output for management commands from the management client application to control any one of the at least two different server applications, wherein said at least two different server applications are each capable of exposing a common management interface, for control and input and output of data, to the management client application, and the management client application is adapted to control any one of said at least two different server applications via the common management interface; and wherein the management client application is capable of communicating data to the server applications through a communication link which is a completely separate communication link than a communication link between a user client application and the two different server applications.

27. A distributed processing system comprising:

a first server application having a first application component and a first management component; and a second server application having a second application component and a second management component, the first and second server applications being different;

a user client application capable of receiving input to execute at least one of the server applications;

a management client application capable of receiving input to control at least one of the server applications;

wherein the first and second application components respectively present interfaces to the user client application, and the first and second management components present the same interface to the management client application; and the management client application is capable of communicating data to the server applications through a first communication link and the user client application is capable of communicating data to the two different server applications through a second communication link, the first and second communication links being completely separate communication links.

28. A method of managing operation of at least two different server applications in a distributed computing environment, the method comprising:

providing a first server application having a first application component and a first management component;

providing a second server application having a second application component and a second management component, the first and second server applications being different;

receiving user input into a user client application to execute at least one of the server applications;

receiving user input into a management client application to control at least one of the server applications;

wherein the first and second application components respectively present interfaces to the user client application and the first and second management components present the same interface to the management client application; and the management client application is capable of communicating data to the server applications through a first communication link and the user client application is capable of communicating data to the two different server applications through a second communication link, the first and second communication links being completely separate communication links.

* * * * *